United States Patent
Dyakin et al.

(10) Patent No.: US 11,277,417 B2
(45) Date of Patent: Mar. 15, 2022

(54) SYSTEM AND METHOD OF GENERATING RULES FOR BLOCKING A COMPUTER ATTACK ON A VEHICLE

(71) Applicant: AO Kaspersky Lab, Moscow (RU)

(72) Inventors: Pavel V. Dyakin, Moscow (RU); Alexander V. Shadrin, Moscow (RU); Dmitry A. Kulagin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 214 days.

(21) Appl. No.: 16/058,469

(22) Filed: Aug. 8, 2018

(65) Prior Publication Data

US 2019/0306180 A1    Oct. 3, 2019

(30) Foreign Application Priority Data

Mar. 30, 2018 (RU) .......................... RU2018111478

(51) Int. Cl.
| G06F 21/00 | (2013.01) |
| H04L 29/06 | (2006.01) |
| H04L 12/40 | (2006.01) |
| G06F 21/56 | (2013.01) |
| G06F 21/64 | (2013.01) |

(52) U.S. Cl.
CPC ........ *H04L 63/1416* (2013.01); *G06F 21/566* (2013.01); *G06F 21/64* (2013.01); *H04L 12/40143* (2013.01); *H04L 63/1425* (2013.01); H04L 2012/40215 (2013.01)

(58) Field of Classification Search
CPC ............. H04L 63/1416; H04L 63/1425; G06F 21/566; G06F 21/64
See application file for complete search history.

(56) References Cited

U.S. PATENT DOCUMENTS

| 10,129,288 B1* | 11/2018 | Xie .................... H04L 63/1416 |
| 2008/0307491 A1* | 12/2008 | Duh ....................... H04L 9/321 |
| | | 726/1 |
| 2015/0113638 A1 | 4/2015 | Valasek et al. |
| 2016/0219051 A1* | 7/2016 | Morita ................ H04L 63/0876 |

(Continued)

FOREIGN PATENT DOCUMENTS

| JP | 2017111796 A | 6/2017 |
| WO | 2017/024078 A1 | 2/2017 |
| WO | 2017/046805 A1 | 3/2017 |

*Primary Examiner* — Jeffrey C Pwu
*Assistant Examiner* — Rodman Alexander Mahmoudi
(74) *Attorney, Agent, or Firm* — Arent Fox LLP; Michael Fainberg

(57) ABSTRACT

Disclosed are systems and methods for generating rules for detecting and blocking attacks on electronics systems of a means of transportation. A security server receives log data having messages that were intercepted on the buses of the means of transportation around the time of a road traffic accident with the means of transportation. The security server detects computer attacks on the electronics systems and generates one or more rules that depend on one or more indicators of compromise, such as malicious messages used in a computer attack and information on at least one ECU that is a recipient of the malicious messages. The generated rules further specify actions for blocking subsequent computer attacks, such as blocking, modifying, or changing communications within the communications bus of the vehicle.

21 Claims, 11 Drawing Sheets

(56) References Cited

U.S. PATENT DOCUMENTS

| | | | | |
|---|---|---|---|---|
| 2016/0297401 | A1* | 10/2016 | Haga | B60R 25/307 |
| 2018/0158329 | A1* | 6/2018 | Benhammou | G08G 1/096 |
| 2019/0108752 | A1* | 4/2019 | Oe | G08G 1/0141 |
| 2019/0140778 | A1* | 5/2019 | Kishikawa | G07C 5/085 |
| 2019/0173912 | A1* | 6/2019 | Ujiie | H04L 12/40013 |
| 2020/0172123 | A1* | 6/2020 | Kubota | B60W 60/0053 |

* cited by examiner

SYSTEM AND METHOD OF GENERATING RULES FOR BLOCKING A COMPUTER ATTACK ON A VEHICLE

CROSS-REFERENCE TO RELATED APPLICATIONS

This application claims benefit of priority under 35 U.S.C. 119(a)-(d) to a Russian Patent Application No. 2018111478 filed on Mar. 30, 2018, which is incorporated by reference herein.

FIELD OF TECHNOLOGY

The present disclosure relates to the field of computer security, more specifically to computer security of electronic systems of vehicles.

BACKGROUND

At present the number of possibilities for computer attacks on automobiles, vehicles, and means of transportation as a whole is constantly increasing, and the number of such attacks is also growing as vehicles become more reliant on computer systems and electronic systems. Therefore, the creation of systems which are able to successfully detect computer attacks and counter them is an urgent task.

When computer attacks are carried out on internal devices of an automobile (primarily meaning the electronic control units (ECU)), even if the attack is successfully detected, it is exceedingly difficult to undertake adequate steps which can neutralize its consequences.

Thus, security experts Charlie Miller and Chris Valasek have published a number of works devoted to the security of automobiles. In a white paper entitled "Adventures in Automotive Networks and Control Units," the security experts described a method of gaining control of a Toyota Prius® automobile of model year 2010 and a Ford Escape® automobile of model year 2010 with the aid of a notebook and a Nintendo® game pad by carrying out a computer attack on the ECU, involving the transmission of packets on the Controller Area Network (CAN) bus. Miller and Valasek were also able to hack into a Jeep Cherokee® automobile of model year 2014 by penetrating the network of the automobile by Wi-Fi, exploiting a vulnerability in the multimedia on-board system of the automobile, as described in another paper entitled "Remote Exploitation of an Unaltered Passenger Vehicle" published on Aug. 10, 2015. Another entry point was a vulnerability in the communication port of the cellular operator Sprint®. To obtain control over the electronic systems of the automobile, the investigators conducted a computer attack on the CAN bus, having modified the firmware of the controller of the CAN bus by introducing a special program code. As a result of the computer attack, the investigators gained the ability to remotely control the operations of the steering wheel, the brake system, and other electronic systems of the automobile. The results of this investigation are in fact linked to the recall of 1.4 million Jeep Cherokee automobiles of model year 2014 by the Fiat Chrysler America group.

However, update cycles in the automobile industry take a long time, and therefore when a vulnerability is discovered in the electronic systems of an automobile the release of an update and installation thereof on the electronic systems of the automobile may take a rather long time, and a recall of the automobile may even be required, while old models of the automobile may even remain with no update at all and, consequently, exposed to the vulnerability. It therefore becomes necessary to develop a solution which is able to detect and block such computer attacks until such time as the vulnerability is eliminated by the automobile maker with the aid of updates to the electronic systems of the automobile.

Existing intrusion detection systems (IDS) are able to discover anomalies in the data being transmitted on the buses of an automobile. However, the operation of IDS systems requires the assembly of a large statistical database, and therefore such systems cannot efficiently detect a complex targeted attack such as those described above. Yet these very kinds of computer attacks are the ones presenting the greatest danger. Additionally, existing intrusion detection systems cannot be easily adapted to the network architecture of vehicles. For example, because of the broadcast nature of the CAN protocol, it can be impossible for receiving ECUs to know whether the sent message was sent by an attacker or by the expected ECU.

It should be noted that in the event of a successful computer attack which resulted in substantial consequences, including a road traffic accident (RTA), information about the causes of the incident (such as the RTA) is extremely significant, even if it was not possible to detect the attack in advance and prevent it. This information is highly valuable both to the car makers and to the authorities conducting the investigation of the incident, since it makes it possible to develop the means for preventing such incidents in future. It must be noted that, at the stage of investigation of the incident already after it has occurred, all evidence indicating that it was caused by a computer attack, if such was the case, may have been removed from the system or lost. And it then becomes impossible to know that the incident was specifically caused by a computer attack, and not by human error, for example.

SUMMARY

According to one aspect of the present disclosure, a computer-implemented method is provided for detecting attacks on electronics systems of a vehicle. The method includes intercepting a plurality of messages transmitted on a first communications bus between a plurality of electronic control units (ECUs) of a vehicle, and determining at least one recipient ECU that is a recipient of the intercepted messages based on which ECUs are communicatively coupled to the first communications bus. The intercepted messages and information indicating the determined at least one recipient ECU are stored in a log. The method further includes detecting a computer attack of the vehicle based on satisfaction of at least one condition of a rule by the stored messages and information in the log, and blocking the computer attack of the vehicle by performing an action associated with the rule. The rule may depend on one or more indicators of compromise comprised of malicious messages used in a computer attack and information on at least one ECU that is a recipient of the malicious messages.

In another exemplary aspect, a computer system for detecting attacks on electronics systems of a vehicle is provided. The computer system includes a plurality of electronic control units (ECUs), a first communications bus configured to communicatively couple the plurality of ECUs, and a hardware processor. The hardware processor is configured to intercept a plurality of messages transmitted on the first communications bus between the plurality of ECUs, and determine at least one recipient ECU that is a recipient of the intercepted messages based on which ECUs are communicatively coupled to the first communications bus. The hardware processor is further configured to store, in a log, the intercepted messages and information indicating the determined at least one recipient ECU. The processor is configured to detect a computer attack of the vehicle based on satisfaction of at least one condition of a rule by the stored messages and information in the log, and block the computer attack of the vehicle by performing an action associated with the rule. The rule may depend on one or more indicators of compromise comprised of malicious messages used in a computer attack and information on at least one ECU that is a recipient of the malicious messages.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
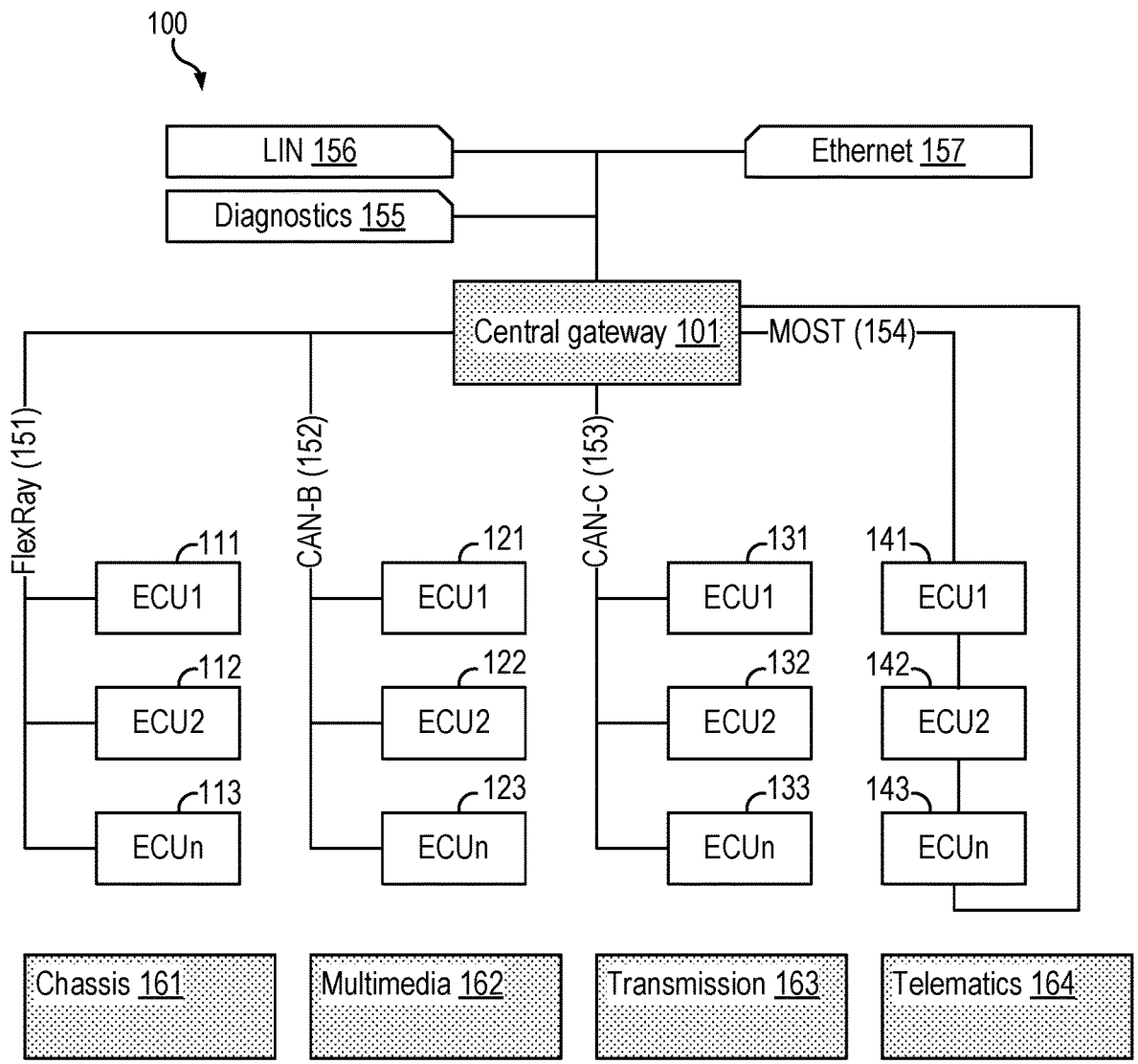
FIG. 1A-1B are block diagrams depicting examples of a network architecture of a means of transportation using the example of an automobile.

Exemplary aspects are described herein in the context of a system, method, and computer program product for detecting attacks on electronics systems of a vehicle. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary: A number of terms are defined herein which will be used to describe variant aspects of the present disclosure.

A means of transportation (hereafter, MT) is a device configured to transport people, freight, or equipment installed aboard it on the roads. For example, the device may be a vehicle, such as an automobile. In the present disclosure, a means of transportation may sometimes be referred to as an automobile or a vehicle.

A means of transportation has an electronic system that includes one or more embedded systems configured to control one or more of the electrical systems or other subsystems of the vehicle. For example, the electronic system of an automobile may include:

1. Sensors and setpoint generators configured to detect operating conditions (e.g. engine speed) and setpoint values (e.g. switch position). The sensors and setpoint generators are further configured to convert physical variables into electrical signals.

2. An electronic control unit (ECU) configured to process the information from the sensors and setpoint generators in mathematical computing processes (open- and closed-loop control algorithms). The ECU controls the actuators by means of electrical output signals. In addition, the ECU acts as an interface to other systems and to the vehicle diagnosis system.

3. Actuators configured to convert the electrical output signals from the ECU into mechanical variables (e.g. solenoid-valve needle lift).

An electronic control unit (ECU) is a structurally separate and functionally complete portion of electronic equipment that contains an electronic circuit of any given degree of complexity for the processing of information constituted by electric signals of an established form.

A bus is a topology of the data transmission network in which all the nodes are connected by passive lines of communication enabling a transmission of data in both directions.

A frame (also a message) is a data block of a communication channel protocol defining the order and value of bits or bit fields in a transmission sequence on a communication channel.

Advanced driver assistance systems are systems for helping the driver of an MT in monitoring the MT, warning the driver and braking the MT, with control processes of the MT, and so on.

Telematic data (also telematics) is navigational data and data on the current state of the working elements which can be transmitted to a dispatch center by the onboard navigational and communication equipment of road vehicles via mobile communication channels.

An information security incident is one or more undesirable or unexpected information security events which will, with a significant degree of probability, result in the compromising of business operations and create threats to information security.

In the present application, by "incident with a means of transportation" (hereafter, incident) is meant one or more undesirable or unexpected events resulting in a change in the expected behavior of an MT, including a road traffic accident (RTA). Aspects of the present disclosure help to solve the stated technical problem precisely in the case when an incident with a means of transportation was caused as a result of an information security incident.

Indicators of compromise (IOC, also indicators of infection) are artifacts or residual signs of an intrusion into an information system which are observable on a computer or in a network. Typical indicators of compromise are antivirus records, IP addresses, check sums of files, URL addresses, domain names of botnet command centers, and others. A number of standards exist for indicators of compromise, in particular: OpenIOC, STIX (Structured Threat Information eXpression), and CybOX™ (Cyber Observable eXpression), and others.

A computer attack (also referred to as a cyber attack or malicious attack) is a targeted action on information systems and information telecommunication networks by hardware and software, carried out for the purpose of breaching the information security in these systems and networks.

A targeted attack (TA) is a particular instance of a computer attack directed at a specific organization or a specific individual.

It should be noted that the present disclosure may be applied to all types of means of transportation utilizing engines (internal combustion engines, hydrogen engines, electrical engines) and containing at least one ECU.

FIG. 1A illustrates an example of a network architecture 100 of a means of transportation using the example of an automobile. First of all, it should be noted that the following buses are used in modern MT, especially automobiles, in accordance with the current standards. For example, the network architecture 100 may be configured to implement CAN (Controller Area Network), which is a communications standard for a network of a means of transportation (and is further specified by ISO 11898-1), which is configured to allow microcontrollers and devices of a vehicle to communicate with each other (e.g., without a host computer). The CAN bus is divided into a high-speed bus CAN-C (ISO 11898-2), in which the speed of data transmission is between 125 kbit/s and 1 Mbit/s, and a low-speed bus CAN-B (ISO 11898-3), in which the speed of data transmission is between 5 kbit/s and 125 kbit/s. The network architecture may be further configured to implement an extension to CAN, referred to as CAN with Flexible Data-Rate (CAN FD).

In another example, the network architecture 100 may be configured to implement FlexRay, which is an ISO 17458-1-17458-5 standard developed as a high-speed and reliable replacement for CAN. The network architecture 100 may be configured to implement LIN (Local Interconnect Network), an ISO 17987 standard for an industrial network, oriented toward the control of automobile systems of low liability. In another example, the network architecture 100 may be configured to implement MOST (Media Oriented Systems Transport), which is the de facto standard for multimedia and computer entertainment networks in the automobile industry. In another example, the network architecture 100 may be configured to use Ethernet, which is a technology for packet data transmission between devices for computer and industrial networks, described by the IEEE standards of group 802.3. It should be noted that the mentioned standards are continually being improved, and new standards and technologies used in means of transportation are also appearing. Therefore, the scope of the present disclosure is not limited to the standards mentioned here, but rather is applicable to any technologies which may be used in means of transportation.

The network 100 of the vehicle may be configured to allow message exchange between ECUs (i.e., nodes) using a multi-master serial bus, such as a CAN bus. The network 100 of a modern MT includes a central gateway 101, a plurality of ECU 111-113 (labeled as ECU1, ECU2, ECUn) associated with a chassis 161 of the vehicle and communicatively coupled thereto by a first bus 151 (e.g., a FlexRay bus), a plurality of ECU 121-123 associated with a multimedia subsystem 162 (also in-car entertainment (ICE), in-vehicle infotainment (IVI)) of the vehicle and communicatively coupled thereto by a second bus 152 (e.g., a CAN-B bus), another plurality of ECU 131-133 associated with a transmission system 163 of the vehicle and communicatively coupled thereto by a third bus 153 (e.g., CAN-C bus) and another group of ECU 141-143 associated with telematics 164 of the vehicle and communicatively coupled thereto by a fourth bus 154 (e.g., a MOST bus). The central gateway 101 also has outputs to the diagnostic bus 155, a local interconnect network (LIN) 156 and an Ethernet 157. In the present example, the network architecture of the MT contains a single central gateway 101, connecting all subsystems of the MT by means of the buses 151-157. As used herein, a module or subsystem that is "connected" to another module or subsystem is communicatively coupled to that module or subsystem by any number of intervening elements, including directly coupled or indirectly coupled.

In some aspects, the bus may be a limited communication interexchange that does not support addressing. In one aspect, the messages are broadcast to all nodes on the bus and each node decides whether the message is intended for them. For example, using a CAN bus, ECUs will broadcast messages, and other ECUs that are interested in certain messages (i.e., by CAN identifier) will listen for those messages and ignore the rest of the messages. In other words, there is no source identifier or authentication built into CAN messages. These limitations introduce challenges in adapting existing computer security techniques to the electronic systems of vehicles. For example, these limitations allow a malicious component to both sniff traffic on the CAN network, as well as masquerade as other ECUs (i.e., data injection). These limitations also make it difficult to reverse-engineer traffic for purposes of computer security analysis because there is no way to know which ECU is sending or receiving a particular CAN message.

Each ECU may include a CAN controller (as a discrete component or as an integral part of the ECU's microcontroller) configured to receive and transmit messages on the CAN bus. To receive a message, the CAN controller may be configured to store received serial bits from the bus until an entire message is available, which can then be fetched by the host processor (e.g., by the CAN controller triggering an interrupt). To transmit a message (e.g., to other ECUs), the CAN controller may be configured to relay a message (provided by the microcontroller) by transmitting the bits serially onto the bus when the bus is free.

In some aspects, the ECU may further include a transceiver configured to facilitate receipt of messages by converting a data stream on the bus from CAN bus levels to levels that the CAN controller uses, and facilitate transmission of messages by converting the data stream from the CAN controller to CAN bus levels. In one aspect, the ECU may be configured to, using the CAN transceiver, transmit a message serially onto the bus using a non-return-to-zero (NRZ) format, which is then received by all ECUs on the bus.

A message or frame may include an identifier (ID) and a data payload (e.g., eight or 64 data bytes per frame). The message may further include redundancy code (cyclic redundancy check, or CRC), an acknowledgement slot, and other fields. In some aspects, the identifier field of the message indicates a priority of the message (e.g., the lower the value, the higher the priority). The identifier field may also be used by each receiving ECU to determine whether they should process the bus signal and receive the message.

Figure 1B:
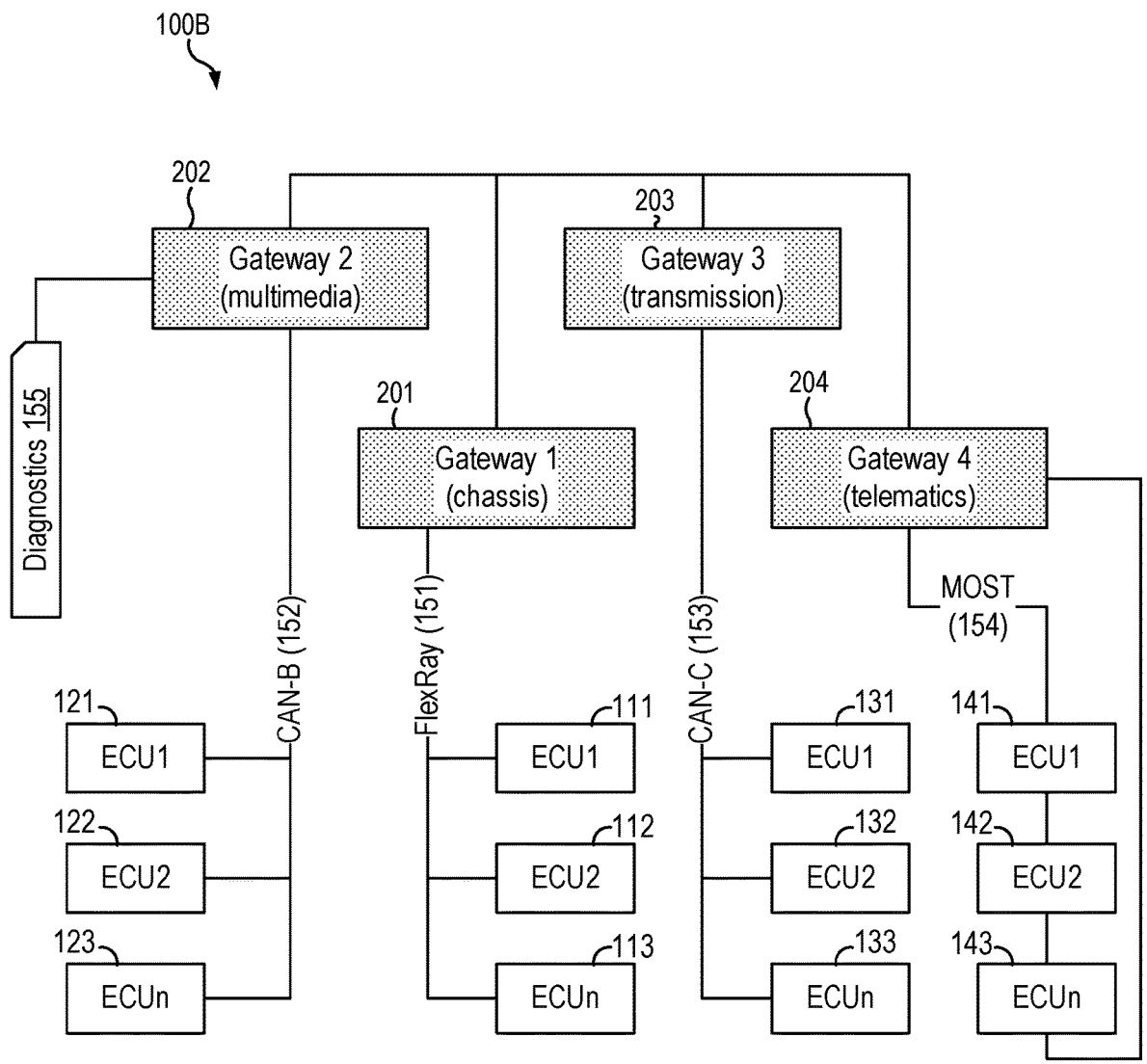

FIG. 1B presents another example of the network architecture 100B of a means of transportation. The network 100B of the MT contains several interconnected gateways 201-204, each of which is responsible for a particular subnetwork. Thus, the gateway 1 (201) is connected to the ECU 111-113 by the FlexRay bus 151, which are responsible for the chassis of the MT. The gateway 2 (202) is connected by the CAN-B bus 152 to the ECU 121-123, which are responsible for the multimedia subsystems of the MT. The gateway 3 (203) is connected by the CAN-C bus 153 to the ECU 131-133, responsible for the transmission. And the gateway 4 (204) is connected by the MOST bus 154 to the ECU 141-143, responsible for the telematics.

Figure 2A:
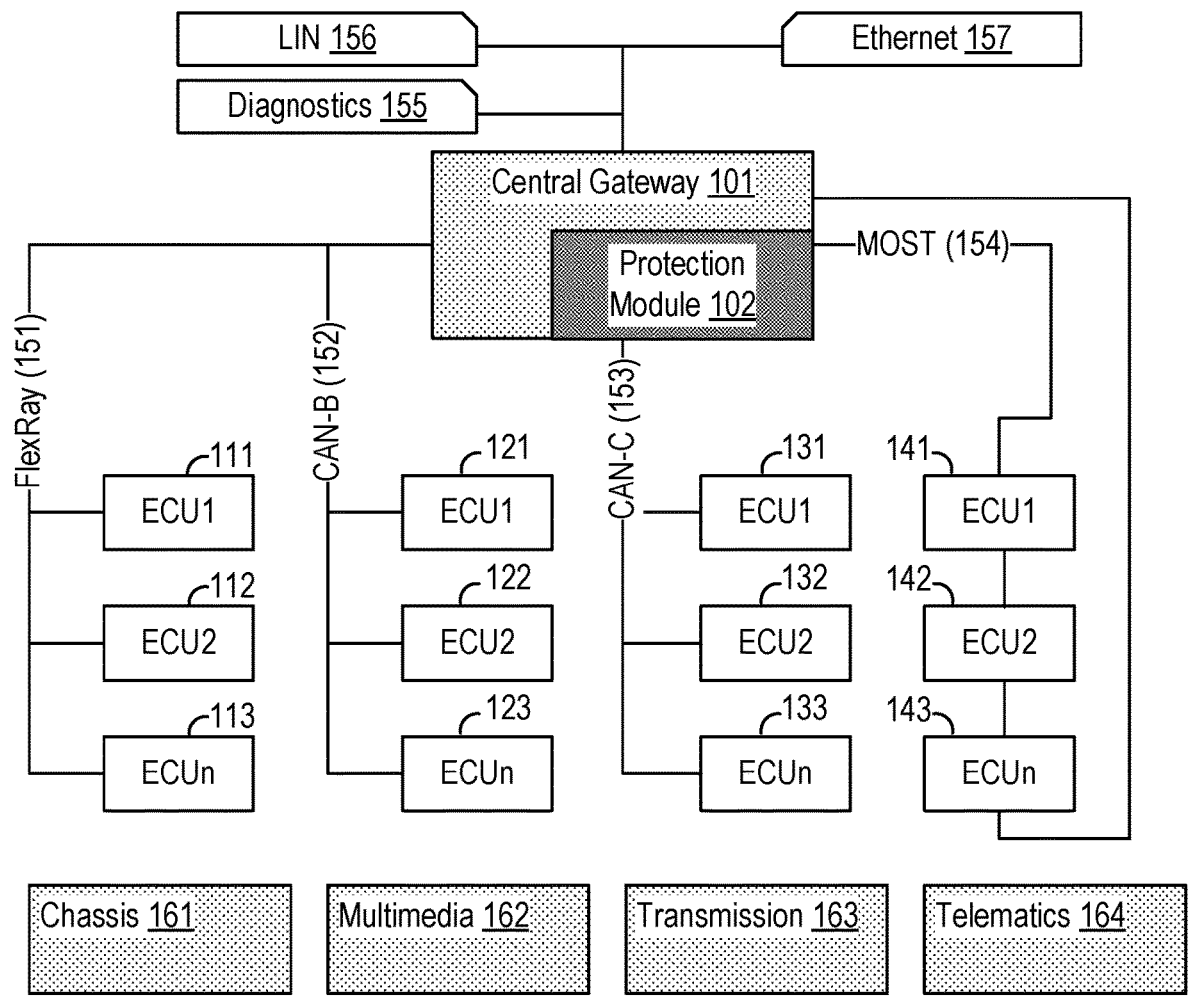
FIG. 2A-2C show examples of the arrangement of a protection module in the network of a means of transportation.

FIG. 2A presents an example of the arrangement of a protection module 102 in the network of a means of transportation. In this example, the network architecture 100 presented in FIG. 1A is used. The protection module 102 serves chiefly to block a computer attack on the MT. By a computer attack on the MT is meant, primarily, a computer attack on the networks of the MT and the electronic systems of the MT, especially the ECU and network gateways. The functionality of the protection module 102 will be described in further detail below. In the example being discussed in FIG. 2A the protection module 102 is a software component of the central gateway 101 and thus it provides protection for all the nodes of the network.

Figure 2B:
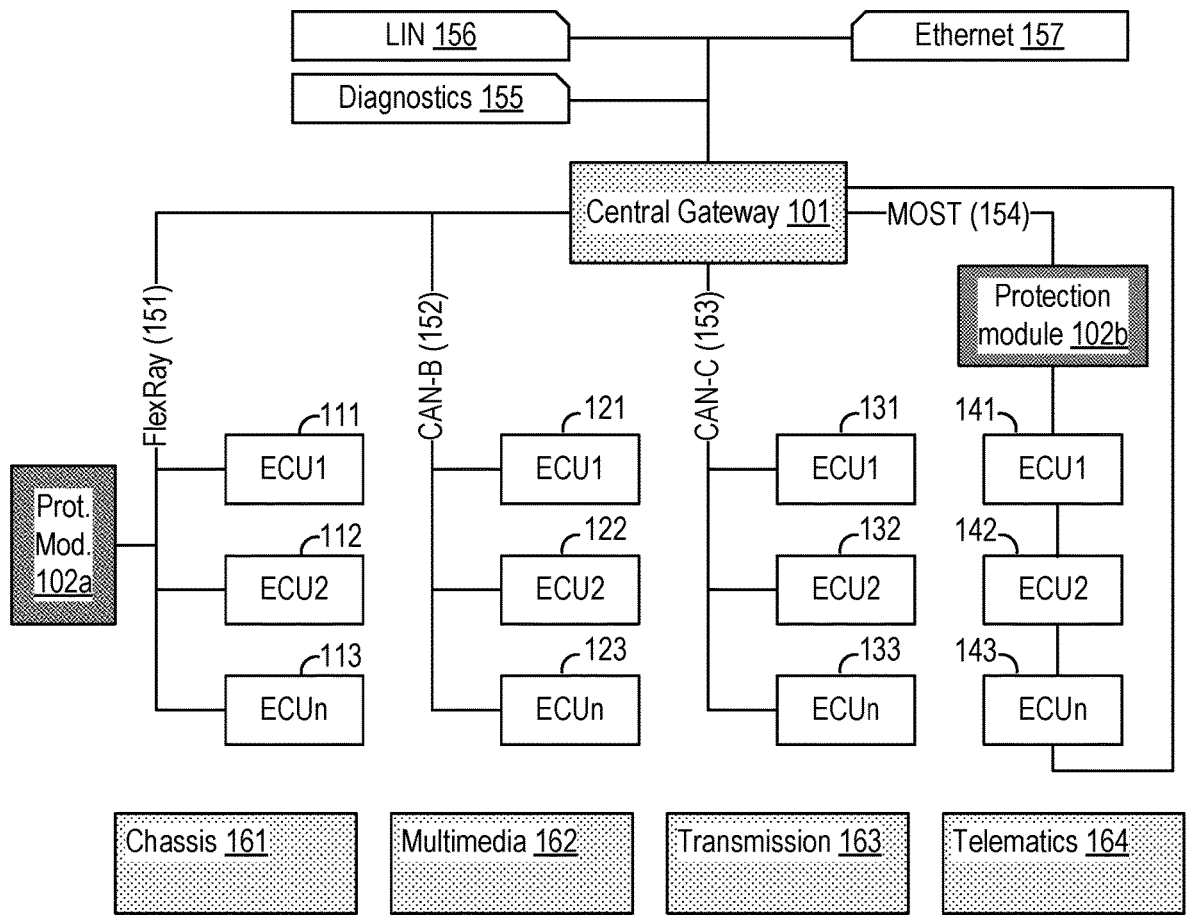

In another example, in FIG. 2B, a system is shown which contains two protection modules 102a-102b, the first of which is connected to the FlexRay bus 151, and the second to the MOST bus 154, and accordingly each of the protection modules 102a-102b will provide protection for the network/subnetwork to which it has access. Obviously, other examples of the connection of the protection module to the network are also possible.

Figure 2C:
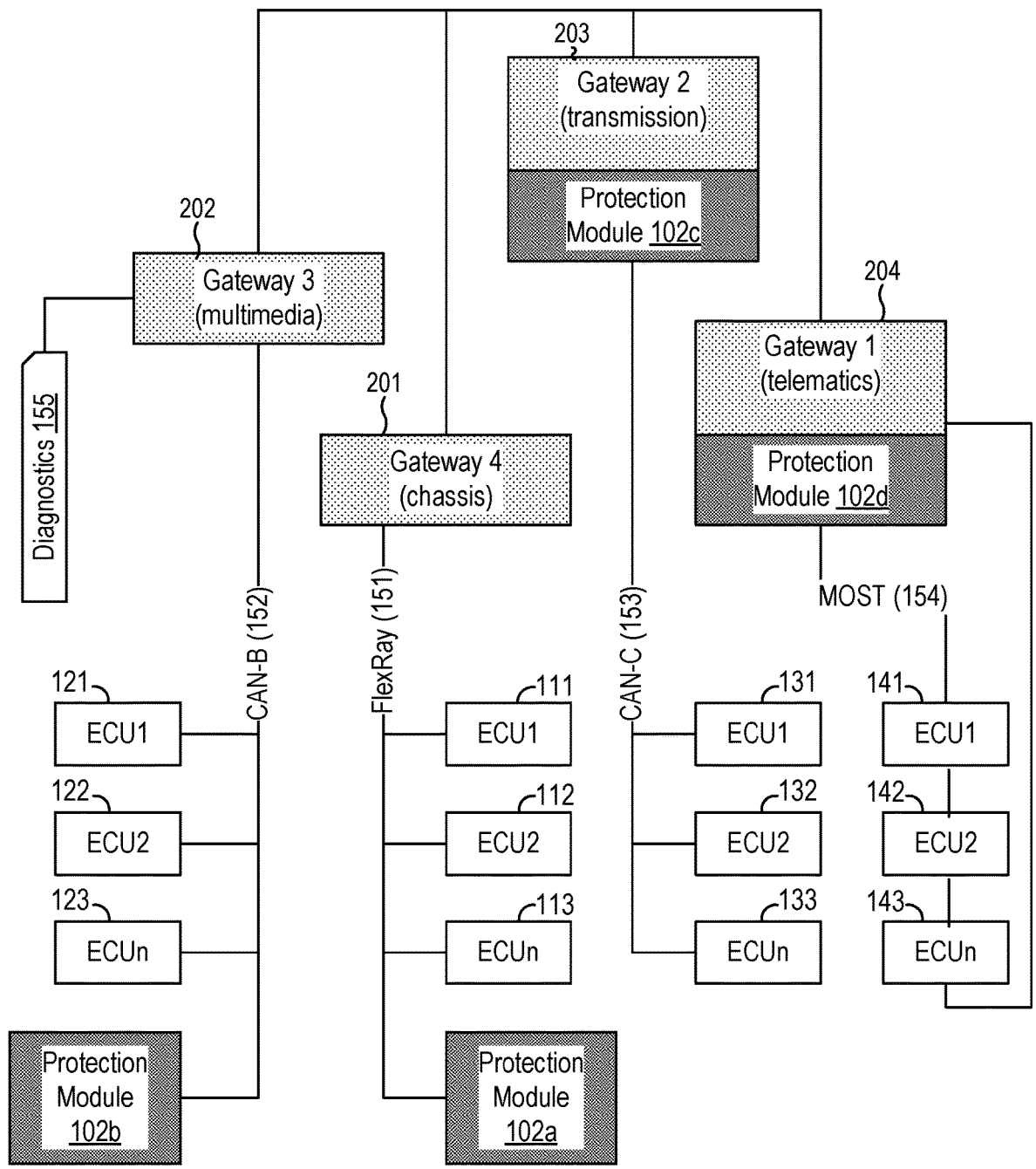

FIG. 2C presents yet another example of the arrangement of the protection module 102 in the network of a means of transportation, making use of the architecture presented in FIG. 1B. The network contains four protection modules 102a-102d. The protection module 102a is connected to the FlexRay bus 151, the protection module 102b is connected to the CAN-B bus 152, and the protection modules 102c-102d are software components of the gateways 203-204 respectively. Each protection module 102a-102d will provide protection for the network/subnetwork to which it has access. Obviously, other examples of the connection of the protection module to the network are also possible. In the general instance, the protection module may be connected to any given subnetwork (i.e., to a bus) and to any given gateway in order to ensure total protection for the network of the MT.

In one aspect, an ECU may belong to one of the following categories: primary electronic system of the MT, and auxiliary electronic system of the MT. Lists of the ECU from the primary and auxiliary systems of the MT may be contained, for example, in the memory of one or more protection modules 102a-102d or in the memory of the gateway. The primary electronic systems include the ECU critical to the control of the MT and the safety of the MT and the people in its surroundings. The auxiliary electronic systems include the ECU providing additional convenience to the driver, affording entertainment options and other additional functions of the MT, the disconnecting of which does not impact the ability to control the MT or its safety.

In one example aspect, ECUs of the auxiliary electronic systems of the MT may include driver assistance systems, multimedia systems (also in-car entertainment (ICE), in-vehicle infotainment (IVI)), and the telematics. The driver assistance systems may contain, in particular, the following ECU: a parking sensor (also parktronics, parking assistance system); a camera monitor system; a block heater; and an anti-lock braking system (ABS). The multimedia systems may include, in particular: a navigation system; an in-car Internet; a steering wheel audio controls; and a hands free voice control. The telematics may include, in particular: a telematic control unit (TCU); a global positioning system (GPS) unit; an external mobile communication interface (GSM, GPRS, 3G, 4G (LTE) Wi-Fi, WiMAX, or Bluetooth), one or more sensors, including acceleration, impact, and spatial orientation sensors; and others. In yet another particular aspect, the list of ECU of the auxiliary electronic systems of the MT further contains untrusted wireless connection channels and autonomous driving systems (down to and including the last level of control).

In another aspect, the list of ECU of the primary electronic systems of the MT includes, in particular: control units associated with the gearbox, and control units associated with the chassis. Control units associated with the gearbox include, in particular: a transmission control unit, a traction control system (TCS), and others. Control units associated with the chassis of the vehicle include, in particular: a cruise control system, a lane-holding system, and others.

It should be noted that, in one aspect, several ECU from the list of auxiliary electronic systems may be moved to the list of primary electronic systems, such as the ABS system. In another aspect, the reverse is the case. It should also be noted that, in one aspect, the lists of primary and auxiliary electronic systems may differ in dependence on the make, model or type of the MT and may be changed adaptively.

Figure 3:
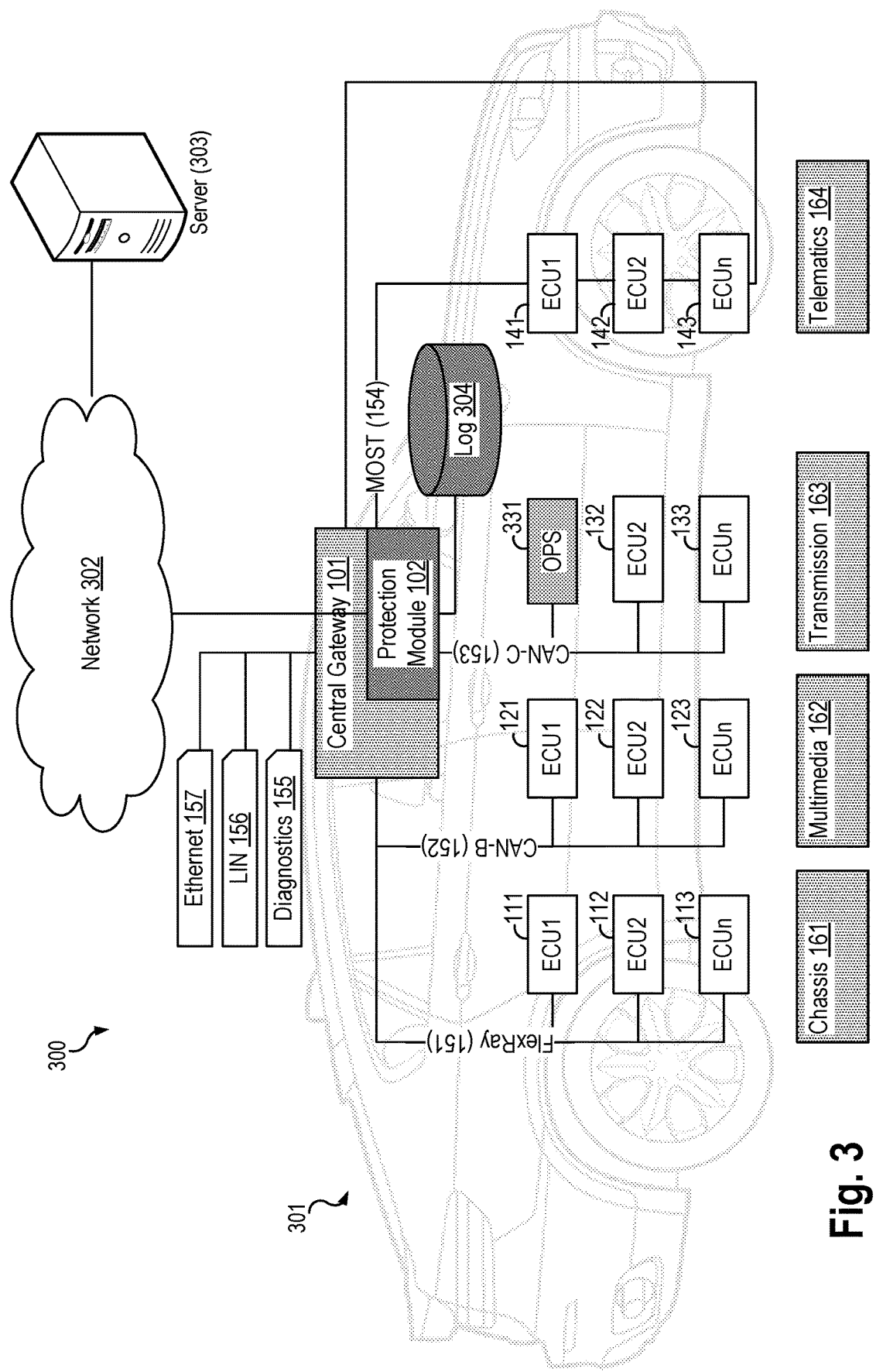
FIG. 3 presents an example of a rules creation system.

FIG. 3 presents an example of a rules creation system 300. In the example considered, the network architecture of the MT has the appearance previously described in FIG. 2A, although the network architecture may be any one of those previously indicated. The system contains at least one means of transportation 301, which in turn includes an occupant protection system (OPS) 331 and a protection module 102. The OPS 331 is connected to the buses of the MT (in the given example, to the CAN-C bus 153) and is configured to ascertain the moment in time of the occurrence of an incident with the MT (such as an RTA).

The protection module 102 is also connected to the buses of the MT (in the given example, it is a module of the central gateway 101) and is configured to intercept messages (also frames) circulating on the buses of the MT, in order to, in the process of intercepting the messages, save in a log 304 these intercepted messages. The protection module 102 may be further configured to save, for each intercepted message, recipient information as to at least one ECU of the MT which is the recipient of that message. The protection module 102 also serves to transmit to the server 303 the portion of the log 304 containing the messages, as well as the information as to at least one ECU which is the recipient of at least one of the mentioned messages which were intercepted by the protection module 102 on the buses of the MT in a certain period around the time of occurrence of the incident with the MT (i.e., in the interval $(t_o-\Delta t, t_o+\Delta t)$, where $t_o$ is the time of occurrence of the incident with the MT, and $\Delta t$ is the certain period around the time of occurrence of the incident with the MT, for example 10 seconds).

Information about the ECU is used to uniquely identify the ECU and it includes, in particular, the unique identifier of the ECU or its designation.

The protection module 102 may communicate with the server 303 by means of a network 302 (i.e., a wireless communications network, such as a Wi-Fi network, LTE, and others). The server 303 is configured to receive the log 304 from the protection module 102 and to detect a computer attack by analyzing the received log 304. The possibility of carrying out a computer attack is contingent upon a vulnerability of the electronic systems of the MT, especially the ECU. Furthermore, the server 303 is configured to determine, in particular, the following indicators of compromise when detecting a computer attack: the messages used in the computer attack; for each message, information on at least one ECU of the MT which is the recipient of at least one of the mentioned messages. The server 303 is also configured to create rules for the protection module 102 on the basis of the indicators of compromise, a rule containing at least one condition for the application of the rule for the detecting of a computer attack on the MT, and at least one action upon application of the rule for blocking the computer attack on the MT. Thus, the condition for application of the rule constitutes a dependency, in particular on the indicators of compromise, which makes it possible to detect a computer attack on the MT. For example, the condition for application of the rule might be as follows: all of the determined indicators of compromise are found in the log 304.

The action upon application of the rule also depends on the indicators of compromise. For example, if an indicator of compromise contains a defined message on the CAN bus and information about the recipient of this message, then the action upon application of the rule might be as follows: block all messages being transmitted on the CAN bus to that recipient. Other possible examples for the creation of rules for the protection module on the basis of the indicators of compromise will be presented below.

In a particular aspect, the indicators of compromise further include the time of interception of the message and, moreover, in the process of intercepting messages the time stamps corresponding to those messages and designating the time of interception of those messages are also saved in the log. In another aspect, the indicators of compromise further include information on at least one ECU which is the recipient of at least one of those messages and, furthermore, the log 304 received further contains at least one of the mentioned ECU.

In one particular aspect, the condition for application of a rule includes the following: the traffic from the buses of the MT intercepted by the protection module contains a defined group of messages (for example, from among the messages contained in defined indicators of compromise).

As mentioned above, an example computer attack on a Jeep Cherokee automobile of model year 2014 has been demonstrated. The following discussion examines more closely how the computer attack was carried out. The cyber-attack included the exploitation of a vulnerability of a vehicle's parking assistance system. A functionality is embedded in the Jeep which blocks the brakes at the moment when the automobile switches to the diagnostic session. For this, a diagnostic CAN message must have been received. As a rule, the majority of ECU ignore such messages if the speed of the automobile exceeds 7-15 km/h, and therefore such a computer attack is possible during slow movement of the automobile. After a switch of the automobile to the diagnostic state in the example being discussed, its brakes cease to work, which is a significant safety problem, even if the automobile is moving slowly at this time. A hacker might utilize this functional inadequacy and send a message on the CAN bus, the message being a command to open a diagnostic session with the ABS of the ECU:

EID: 18DA28F1, Len: 08, Data: 02 10 03 00 00 00 00 00

The hacker then depresses on the brakes to the utmost. This command is carried out by sending several messages on the CAN bus:

EID: 18DA28F1, Len: 08, Data: 10 11 2F 5A BF 03 64 64
EID: 18DA28F1, Len: 08, Data: 64 64 64 64 64 64 64 64
EID: 18DA28F1, Len: 08, Data: 64 64 64 00 00 00 00 00

Thus, the indicated CAN messages may be defined as indicators of compromise and, in the case of the described vulnerability, in the example aspect the condition for application of the rules on the basis of indicators of compromise may be defined as the presence of the aforementioned group of messages during the movement of the automobile:

EID: 18DA28F1, Len: 08, Data: 02 10 03 00 00 00 00 00
EID: 18DA28F1, Len: 08, Data: 10 11 2F 5A BF 03 64 64
EID: 18DA28F1, Len: 08, Data: 64 64 64 64 64 64 64 64
EID: 18DA28F1, Len: 08, Data: 64 64 64 00 00 00 00 00

Thus, upon receiving these messages during the movement of the automobile, the actions upon application of the rule will be carried out and the computer attack will be blocked, and the above-described scenario will not take place.

In another aspect, the condition for application of a rule additionally includes information on the fact that the receivers or the senders of messages from the aforementioned group of messages are certain ECU. Thus, in the example considered with the Jeep, the condition for application of the rule will also contain information on the recipient of the messages—the ABS of the ECU. For instance, the condition of the rule may specify (a) that the following group of messages is received:

EID: 18DA28F1, Len: 08, Data: 02 10 03 00 00 00 00 00
EID: 18DA28F1, Len: 08, Data: 10 11 2F 5A BF 03 64 64
EID: 18DA28F1, Len: 08, Data: 64 64 64 64 64 64 64 64
EID: 18DA28F1, Len: 08, Data: 64 64 64 00 00 00 00 00, and in which (b) the recipient of the group of messages is:
ABS of the ECU In yet another particular aspect, the condition for application of the rule will also contain the information that messages from a defined group of messages are arranged in a particular order and were intercepted by the protection module during a particular interval of time. In the context of the Jeep example, the condition for application of the rule may specify that (a) a group of messages is received in the following order:

1. EID: 18DA28F1, Len: 08, Data: 02 10 03 00 00 00 00 00
2. EID: 18DA28F1, Len: 08, Data: 10 11 2F 5A BF 03 64 64
3. EID: 18DA28F1, Len: 08, Data: 64 64 64 64 64 64 64 64
4. EID: 18DA28F1, Len: 08, Data: 64 64 64 00 00 00 00 00, that (b) the recipient of the group of messages is: "ABS of the ECU"; and that (c) the time difference of receiving the messages is:

1.-2.—not more than 1 minute
2.-3., 3.-4.—not more than 100 milliseconds

Thus, the condition has been added to the indicated rule that an interval of time not exceeding 1 minute should occur between the first and the second message, and an interval of time not longer than 100 milliseconds should occur between the second and the third, as well as the third and the fourth message. In fact, the first message contains a command to switch to diagnostic mode, after which come three messages containing a braking command, and therefore they will follow closely.

In yet another particular aspect, the condition for application of the rule will depend on the state of the ECU. In another aspect, the condition for application of the rule will also depend on the indicators of the sensors of the MT. For example, the rule may contain the condition of movement of the automobile. That is, if the automobile is in motion and the above-indicated CAN messages arrive, the condition for application of the rule will be fulfilled, but if the automobile is not moving, the rule will not be applied, since in the second case the receiving of such messages does not indicate the exploiting of a vulnerability and a computer attack.

As for the actions upon application of a rule, in one aspect they include in particular the following: (a) sending a message to at least one ECU; (b) blocking the sending of at least one message from among the messages contained in defined indicators of compromise; or (c) making a change in at least one message from among the messages contained in defined indicators of compromise.

In one aspect, the message sent to at least one ECU may contain a command specifying instructions to disconnect at least one ECU from the list of ECU of the auxiliary electronic systems of the MT. In the example of the Jeep, the ABS of the ECU may be disconnected, for example, as a result of which the above-described computer attack will not take place. In another aspect, the message sent to at least one ECU may contain a command specifying instructions to turn on or enable a safety mode for at least one ECU from the list of ECU of the primary electronic systems of the MT. In safety mode, the functioning of the MT is subjected to restrictions which allow either the total elimination or the reduction to an acceptable degree of the risks of its operation in a dangerous situation. For example, it is possible to limit the maximum speed of the MT. When moving at restricted speed, the driver still has the option of parking the MT or getting to a service station (the MT is not entirely blocked), but the risks involved in the control of the MT are significantly reduced.

Figure 6:
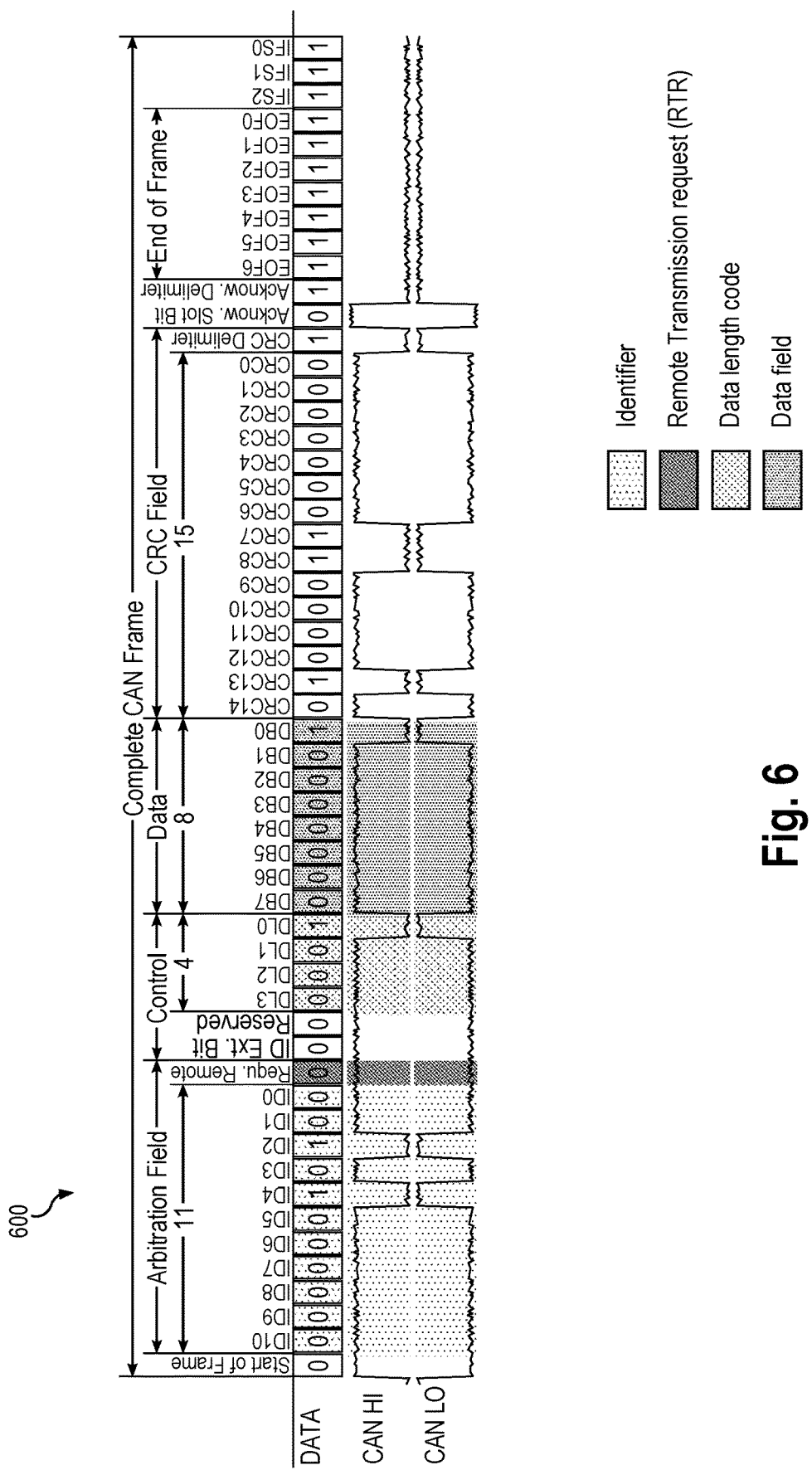
FIG. 6 presents the format of a frame of the CAN protocol.

In one particular aspect, the blocking of the sending of the messages contained in the mentioned rule is performed via the gateway from one subnetwork to the other subnetwork according to the rule. For example, in the context of the sample network architecture of FIG. 3, the central gateway 101 may block the sending of messages from one subnetwork to the other, for example between the CAN-B bus 152 and the CAN-C bus 153. The gateway 101 receives a message from one subnetwork of the electronic system of the MT configured for transmission to the other subnetwork and uses the protection module 102 to verify the possibility of transmission of the message. Transmission of the message occurs only in the event that the protection module allows this message to pass. Otherwise, the message will not be transmitted further;

In another aspect, the blocking of the sending of the messages contained in the mentioned rule may be performed between the ECU on the same bus according to the mentioned rule. For example, in the context of the network in FIG. 3, the ability to send messages between ECU1 121 and ECU2 122 may be blocked on the CAN-B bus 152. A variety of techniques can be used for blocking the transmission of a message on a CAN bus by one ECU using the means of another ECU situated on the same bus. One such possible method will be described as follows. When transmitting a message on a CAN bus, a bit corresponding to 1 may be suppressed by a bit 0 when the latter is transmitted at the same time as the 1 (the frame format is shown in FIG. 6). The data frame on the CAN bus has a data structure ending with a field containing a check sum of the message (15 bits). Therefore, the central gateway 101 has the possibility of checking the frame content with the use of the protection module 102, and upon detecting an unwanted message in the process of transmitting the check sum of this message the protection module 102 can change the value of said check sum by sending a sequence consisting of bits 0. In keeping with the operating principles of the CAN bus, in this case instead of the original value of the check sum, a different—zero—value will be established on the bus. Upon receiving such a message, the ECU addressee will detect a discrepancy in the check sum of the message, and such a message will not be processed.

In a particular aspect, the list of ECU of the auxiliary electronic systems of the MT contains in particular: a) the driver assistance systems; b) the multimedia systems; c) the telematics. In another aspect, the list of ECU of the primary electronic systems of the MT contains in particular: a) the gearbox; b) the chassis.

In yet another aspect, analysis of the received log is carried out with the use of methods of machine learning or by an expert.

In one aspect, the change made in at least one message from among the messages contained in defined indicators of compromise may be performed by a protection module 102 to remove malicious commands contained in the message. In one implementation, the protection module 102 can modify at least one message transmitted from a subnet to another subnet in which the protection module 102 is located in a gateway connecting these subnets. For example, in the example system shown in FIG. 2C, the protection module 102c located in the gateway 203 between the buses 153, 154 may modify a message sent from an ECU in the bus 154 having an ECU addressee in the bus 153 to remove malicious commands relating to the transmission components of the vehicle. In another aspect, the change made in at least one message from among the messages contained in defined indicators of compromise may be divided into two actions: a blocking of messages (as described earlier) and the sending of a new message which does not contain indicators of compromise according to the mentioned rule(s).

In a particular aspect, the ECU which are contained in the action upon application of a rule include the ECU which are contained in the indicators of compromise.

The use of methods of machine learning makes it possible to discover anomalies in the log entries by comparing them against data in which the anomalies are known to be absent. Furthermore, one may use models describing the functioning of the means of transportation. Departures from these models are a sign of an anomaly requiring further investigation. For example, a significant change in speed of the MT during a short interval of time may be considered to be an anomaly. Another example of an anomaly may be the sending of a command from the subnetwork of the multimedia system of the MT to the subnetwork controlling the chassis of the MT.

In cases when anomaly detection system have not initially found any problems, yet there is reason to assume that a problem nevertheless exists, experts having the set of necessary skills may be brought in. For example, additional analysis may be performed in response to detecting a series of the same kind of RTA, occurring in situations when no obvious background existed for them. In another example, additional analysis may be performed in response to detecting RTA with serious consequences, in cases where the cause of the RTA could not be identified by other means.

An expert possessing information on the purpose of the messages, the specifications of the protocols, and other necessary information should reconstruct the picture of the event and explain whether the RTA was caused by anomalous behavior of the system, or whether the system was functioning properly at the time of the RTA.

After detecting a computer attack, in one aspect a request to update the software may be submitted to the supplier of the ECU (for example of the ABS of the ECU) which is the indicator of compromise (or to the maker of the MT). After receiving from the supplier of the ECU (or the maker of the MT, respectively) an update correcting the possibility of carrying out a computer attack and after installing this update in the corresponding ECU, a script may be added which removes the rule, since said rule is no longer relevant (step 533).

Figure 4:
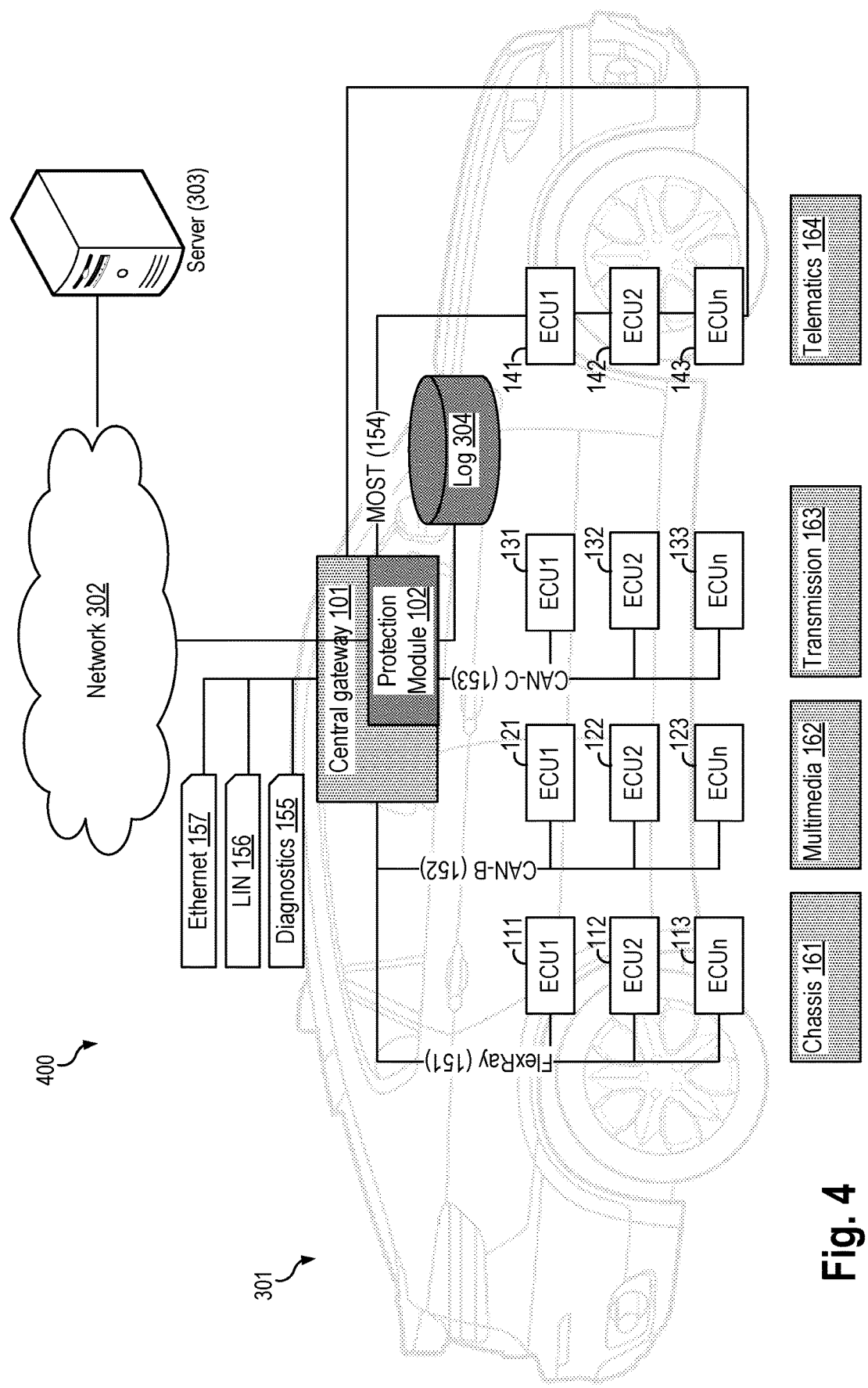
FIG. 4 presents a system for blocking a computer attack on a means of transportation.

FIG. 4 presents a system 400 for blocking a computer attack on a means of transportation. The system 400 is configured to implement the method of blocking a computer attack which is carried out by the protection module 102 in the means of transportation 301. Therefore, a number of the elements of the system 400 and also of the aspects coincide with those described in FIG. 3. The system contains at least one bus of the MT, to which is connected at least one ECU. The system contains a protection module 102, which is connected to at least one of the buses of the MT. As an example, the network architecture of the MT presented in FIG. 2A is used. The protection module 102 is configured to obtain rules from the server 303 via the network 302. A rule obtained, created on the basis of the indicators of compromise, may contain at least one condition for application of the rule and at least one action upon application of the rule. The indicators of compromise are, in particular, the following: (i) messages used in a computer attack, and (ii) information on at least one ECU of the MT which is the recipient of at least one of the mentioned messages.

Furthermore, the protection module 102 is configured to intercept messages being transmitted on the buses of the MT, for checking the condition for the application of the rules obtained with the use of the log 304, and also for blocking a computer attack on the MT by performing the actions upon application of the rule when the conditions for application of that rule are fulfilled.

The particular aspects described above for the system of FIG. 3 are also applicable to the system of FIG. 4.

Figure 5A:
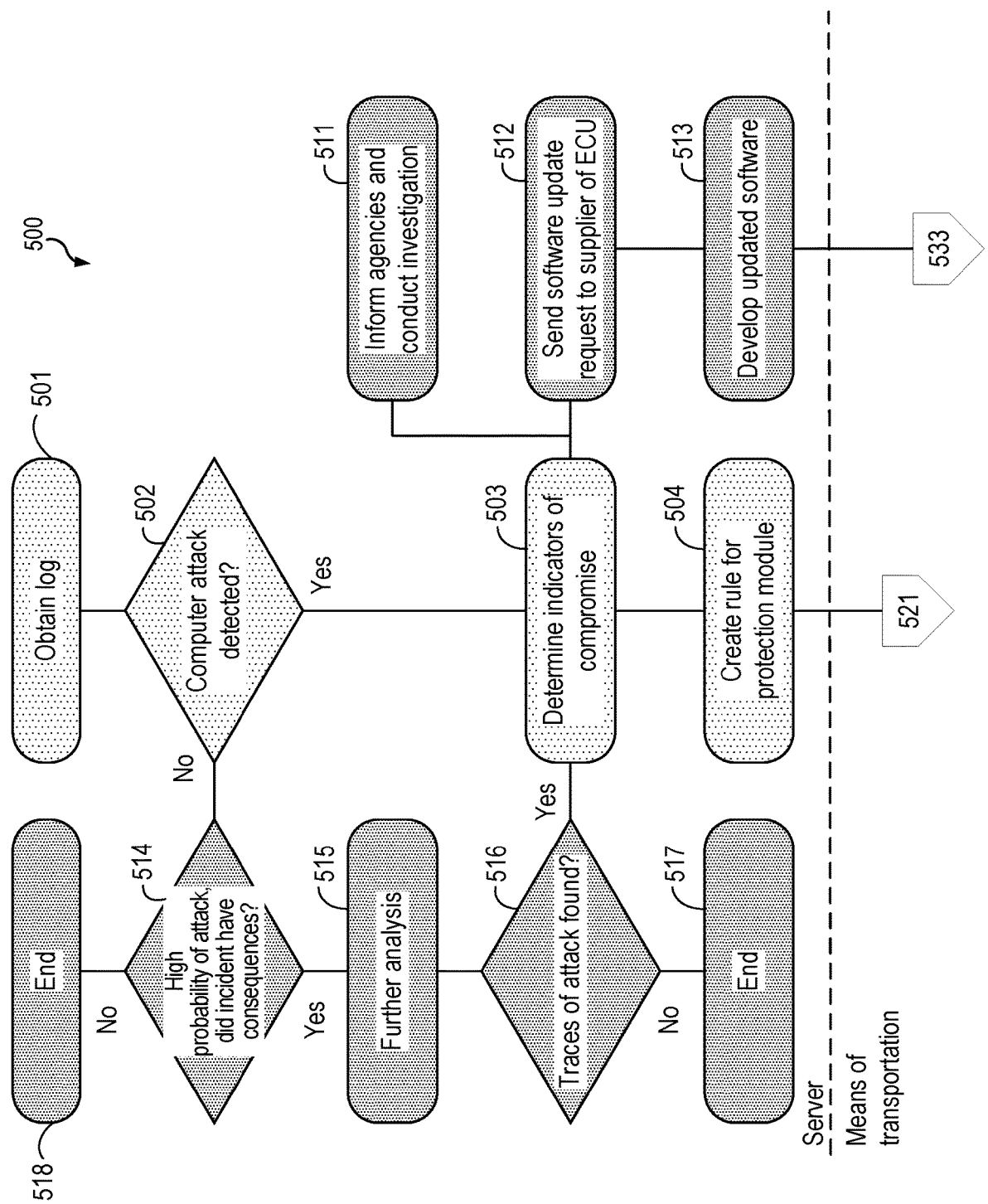
FIG. 5A-FIG. 5B show a flowchart illustrating methods of implementing aspects of the present disclosure, specifically for the systems of FIG. 3-4.
Figure 5B:
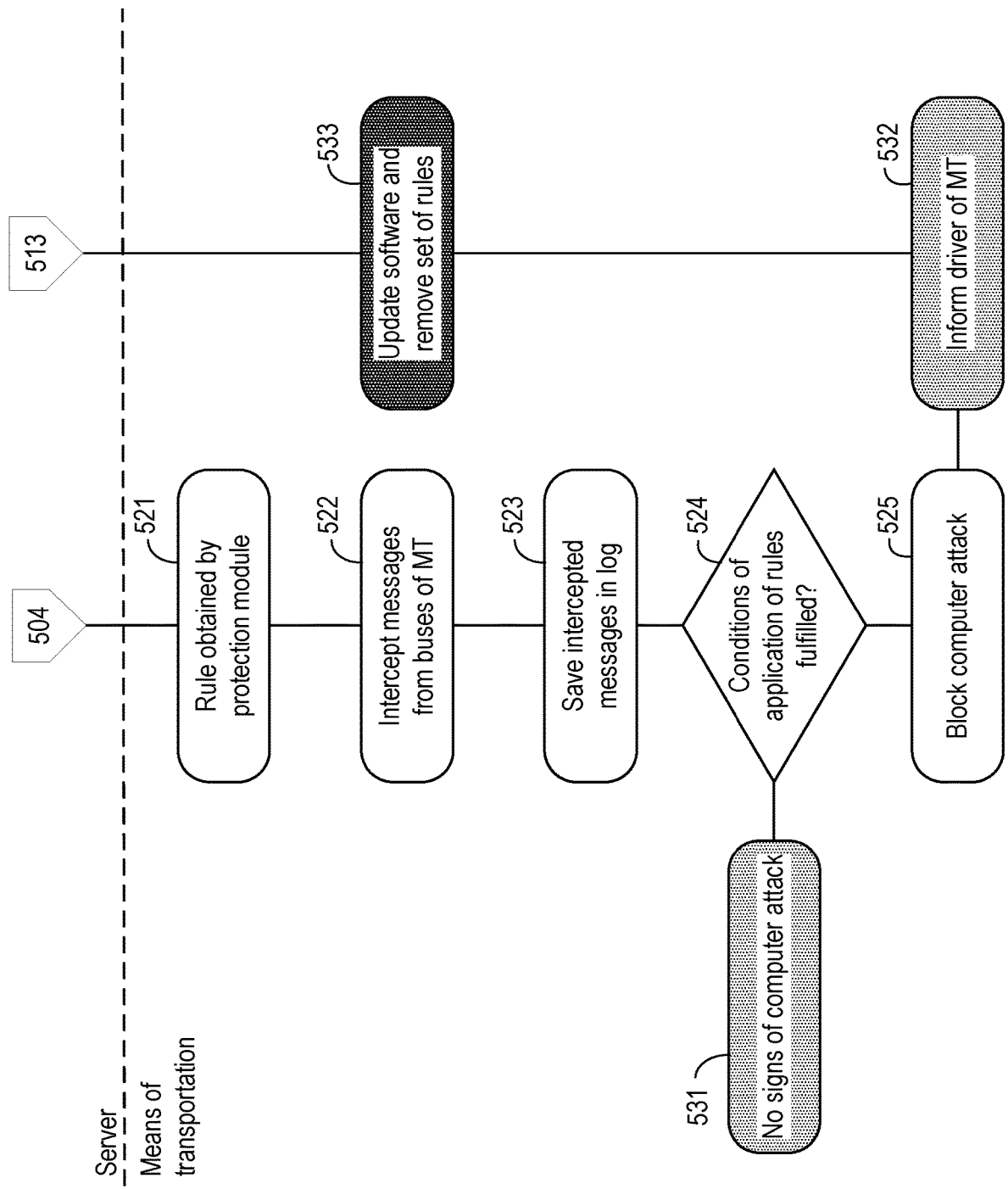

FIG. 5A-FIG. 5B is a flowchart illustrating methods 500 of implementing aspects of the present disclosure, specifically for the systems of FIG. 3-4. A method for creating rules includes the following. In step 501 the server 303 receives the log 304 from the protection module 102 of at least one MT 301. The log 304 contains messages, and also information on at least one ECU which is the recipient of at least one of the mentioned messages that have been intercepted by the protection module 102 on the buses of the MT 301 in a certain period around of the time of occurrence of an incident with the MT (such as an RTA). Next, in step 502, the detection of a computer attack is carried out by analyzing the obtained log 304. After this, in step 503, upon detecting a computer attack the following indicators of compromise in particular are determined: the messages used in the computer attack, and for each message information on at least one ECU of the MT which is the recipient of that message. As a result, in step 504 a rule is created for the protection module 102 on the basis of the indicators of compromise, which rule contains at least one condition for the application of the rule for the detection of a computer attack on the MT, and at least one action upon application of the rule for the blocking of the computer attack on the MT.

In a particular aspect, after detecting a computer attack and determining the indicators of compromise, the authorities (law enforcement agencies, insurance company) may be informed about the detected computer attack in order to carry out a group of measures to ascertain the persons responsible for the computer attack and bring them to justice (511) and also to meet the needs of the insurance company in determining the extent of the indemnification payments. In addition, information about a computer attack (the indicators of compromise, the log 304, information about the MT, telemetry data, etc.) together with a request for a software update may be sent to the maker of the MT and/or the supplier of the ECU (512) that were utilized in carrying out the detected computer attack (accordingly indicated in the indicators of compromise). This step will allow the maker of the MT and the supplier of the ECU to develop an update for the software (513) of the electronic systems of the MT, especially the indicated ECU, which will eliminate the possibility of carrying out a computer attack. After developing the software update, this will be delivered and installed in all the MT for which the possibility exists of carrying out the detected computer attack (step 533). Furthermore, a recall of all the MT is possible, and also a servicing may be performed to eliminate the possibility of carrying out a computer attack.

In another particular aspect, the analysis of the log 304 further includes a determination of the probability of a computer attack being conducted on the basis of the log 304. In step 514, if the probability of a computer attack being conducted exceeds a given value (such as 0.997, or within 3 standard deviations) or if the incident with the MT had severe consequences (for example, an RTA with serious consequences), it is considered that a computer attack has been detected or the conducting of a further detailed analysis of the log 304 is initiated (step 515).

In calculating the probability of a computer attack being conducted, the server 303 take the following into consideration: that the RTA was caused by a set of factors, each of which is not an anomaly, but in their totality they result in the RTA and the probability that all of these factors occurred at the same time in the course of normal operation of the MT is low. Thus, the ECU malfunctioning at the time of occurrence of the incident are determined, and the probability of a computer attack being conducted is determined as being equal to the probability of the simultaneous malfunctioning of all the mentioned ECU (the probability of malfunctioning of each ECU is known in advance, for example it may be provided by the maker of the MT or the ECU). Let us consider an example in which the RTA occurred as a result of the coordinated failure of 3 different independent ECU, the failure of any two of which will not result in an RTA. Let us assume that the probability of failure of the first system is 0.1, the probability of failure of the second system is 0.15 and the probability of failure of the third system is 0.18. The combined probability of a random failure of all three systems in this case is 0.0027, and accordingly the probability that the failure was not caused by random factors is 0.9973, which surpasses the threshold value.

In another aspect, the server 303 take the following into consideration for calculating the probability of a computer attack being conducted: a large number of the same kind of RTA are registered in a short interval of time. Evaluation of the probability of an RTA of the given type with the MT of the given model in the course of the specified interval of time may be carried out by statistical methods. If it turns out that a large number of the same type of RTA occurred in a short interval of time, the probability that such a series of RTA was caused by random factors is very low and accordingly the probability of a targeted action may turn out to surpass the threshold value.

There are many other probability models which can be used to calculate the probability of an RTA having been caused by a computer attack. In a particular aspect, Bayesian belief networks, Markov chains, and other probability models may be used to calculate the probability of occurrence of an RTA as a result of a computer attack.

In a particular aspect, the calculation of the probability of a computer attack being conducted, and also the subsequent further analysis of the log 304 may include manual analysis by a security specialist. In yet another particular aspect, all similar incidents may be aggregated and an analysis conducted using the methods of machine learning. The aggregation of the incidents may be performed by identical makes and models of the MT, the ECU and gateways used, similar circumstances of the incident (RTA), partially coinciding or intersecting logs 304 for different MT and other characteristics. As a result of performing the further analysis, if a computer attack is confirmed or if the traces of a computer attack that has been conducted are found (step 516), there will follow next a step 503 in which the indicators of compromise of the computer attack will be determined, after which a rule will be created for the protection module 102 in step 504. Obviously, if in step 514 the calculated probability of a computer attack is lower than a given value, and the incident did not have severe consequences (RTA with insignificant consequences), the method will stop (step 518). Similarly, if as a result of the further analysis in step 515 no traces of a computer attack have been found, the method will stop (step 517).

In a particular aspect, the rules created by the server 303 in steps 501-504 are then used in the method of blocking a computer attack on the MT. In step 521 the protection module 102 receives at least one rule. Then, in step 522, the protection module 102 intercepts messages being transmitted on the buses of the MT and in step 523 in the process of intercepting the messages the protection module 102 saves the intercepted messages in the log 304, and also for each intercepted message at least one ECU of the MT which is the recipient of that message. In some aspects, the protection module 102 extracts from the intercepted CAN message an identifier, which can determine the ECU-addressees.

In one aspect, the protection module 102 may intercept a plurality of messages transmitted on a first communications bus between a plurality of electronic control units (ECUs) of a vehicle. In some aspects, the first communications bus comprises a Controller Area Network (CAN) bus, such that messages sent on the CAN bus are broadcast to all of the ECUs communicatively coupled to the CAN bus. The protection module 102 may determine at least one recipient ECU that is a recipient of the intercepted messages based on which ECUs are communicatively coupled to the first communications bus. In some aspects, the protection module 102 may determine at least one recipient ECU that is a recipient of the intercepted messages based on the ID contained in the message on the CAN bus. The protection module 102 may store, in a log 304, the intercepted messages and information indicating the determined at least one recipient ECU. In some aspects, the protection module 102 may store, in the log, time stamps corresponding to a time of interception of the intercepted messages.

In step 524 in the process of intercepting messages the protection module 102 checks the conditions for application of the received rules with the use of the log 304. In one aspect, the protection module 102 may detect a computer attack of the vehicle based on satisfaction of at least one condition of a rule by the stored messages and information in the log. In some aspects, the computer attack is detected further based on the time stamps in the log. In one example, the at least condition of the rule specifies presence of a defined group of messages in the log during a period of time associated with movement of the vehicle. In some aspects, the at least one condition of the rule further specifies that the information indicating the at least one recipient ECU that is a recipient of the messages matches a defined group of ECU. In some aspects, the at least one condition of the rule further specifies a state of movement of the vehicle, such that the rule is applied responsive to determining that the vehicle is in motion, and the rule is not applied responsive to determining that the vehicle is not moving. For example, if the vehicle is in motion and the above-indicated defined group of CAN messages arrive, the condition for application of the rule is satisfied; but if the automobile is not moving, the rule will not be applied, since in the second case it can be concluded that the receipt of such messages is not correlated with the exploitation of a vulnerability or computer attack. In another example, the at least one condition of the rule further specifies the presence of a defined group of messages arranged in a defined order in the log and were intercepted during a defined interval of time.

Upon fulfillment of the conditions for application of at least one rule, in step 525 the computer attack on the MT is blocked by carrying out the actions upon application of the rule. If the conditions for application of the rules are not fulfilled, then the entries in the log 304 contain no signs of a computer attack (531).

In one aspect, the protection module 102 may block the computer attack of the vehicle by performing an action associated with the rule. For example, the rule may specify that, responsive to determining that a portion of the intercepted messages matches a defined group of messages to a first recipient, the action performed is that all messages are blocked from being transmitted on the first communications bus to the first recipient.

In one aspect, the computer attack may be blocked by transmitting to at least one ECU a message containing a command to disconnect the at least one ECU, based a determination that the at least one ECU that is on a list of ECUs of auxiliary electronic systems of the vehicle. For instance, using the above-described example of the Jeep, the ABS of the ECU may be disconnected, for example, as a result of which the above-described computer attack will not take place. In another aspect, the computer attack may be blocked by transmitting to at least one ECU a message containing a command to enable a safety mode for the at least one ECU that is on a list of ECUs of primary electronic systems of the vehicle.

In another aspect, the computer attack may be blocked by blocking transmission of at least one message from the first communications bus to a second communications bus of the vehicle via a gateway. For example, in the context of the sample network architecture of FIG. 3, the central gateway 101 may block the sending of messages from one subnetwork to the other, for example between the CAN-B bus 152 and the CAN-C bus 153. In some aspects, the computer attack may be blocked by blocking transmission of at least one message between ECUs communicatively coupled on the same first communications bus. In one implementation, this can be accomplished by having the protection module 102 send a sequence of bit zeros on the bus, such that a different value than the at least one message is established on the bus, causing a receiving ECU to disregard the at least one message due to a discrepancy in a checksum of the message.

Obviously, the rules received in step 521 may be created not only as a result of carrying out steps 501-504, but also in other cases. For example, a security audit of the MT may be carried out on the server 303 or directly on the MT 301 and a vulnerability may be discovered in one or more ECU. The indicated vulnerability need not have been exploited by hackers. In yet another example, outside investigators might discover a vulnerability in one or more ECU and report this to the maker. As a result, prior to releasing the update of the corresponding ECU a rule will be created for the protection module 102 to prevent the possibility of exploitation of the discovered vulnerability. The rule may be sent to the protection module 102 by the server 303 or it may be downloaded with the use of the network interface of the MT, for example via the diagnostic interface 155, for example at a service center.

In a particular aspect, after the blocking of a computer attack 525 the driver of the MT may also be informed in step 532. In yet another particular aspect, it may be necessary for the driver of the MT to perform a series of actions, such as allowing the disconnecting of the ECU module which was used in the computer attack.

After receiving from the supplier of the ECU an update correcting the possibility of conducting a computer attack and after installing this update in the corresponding ECU, a script may be obtained from the server 303 and executed to remove the rule in view of said rule no longer being relevant (step 533). In one aspects, responsive to applying, to one or more ECUs of the vehicle, a software update configured to patch a vulnerability of the ECU, the protection module 102 may remove one or more rules for detecting a computer attack on the vehicle.

FIG. 6 presents the format of a frame of the CAN protocol. As shown a frame or message can include an identifier field (e.g., 11 bits) which is a unique identifier that represents the priority of the message within the bus. A message may further include a remote transmission request (RTR) field (e.g., 1 bit) which indicates a value that is dominant (i.e., 0 value) for data frames, or recessive (e.g., value of 1) for remote request frames. The message may further include a data length code (DLC) field that indicates a number of bytes of data contained in the message frame. The message then includes a data field containing the data to be transmitted. Additional fields in the message may include CRC fields, ACK slot, and an End of Frame indication.

Figure 7:
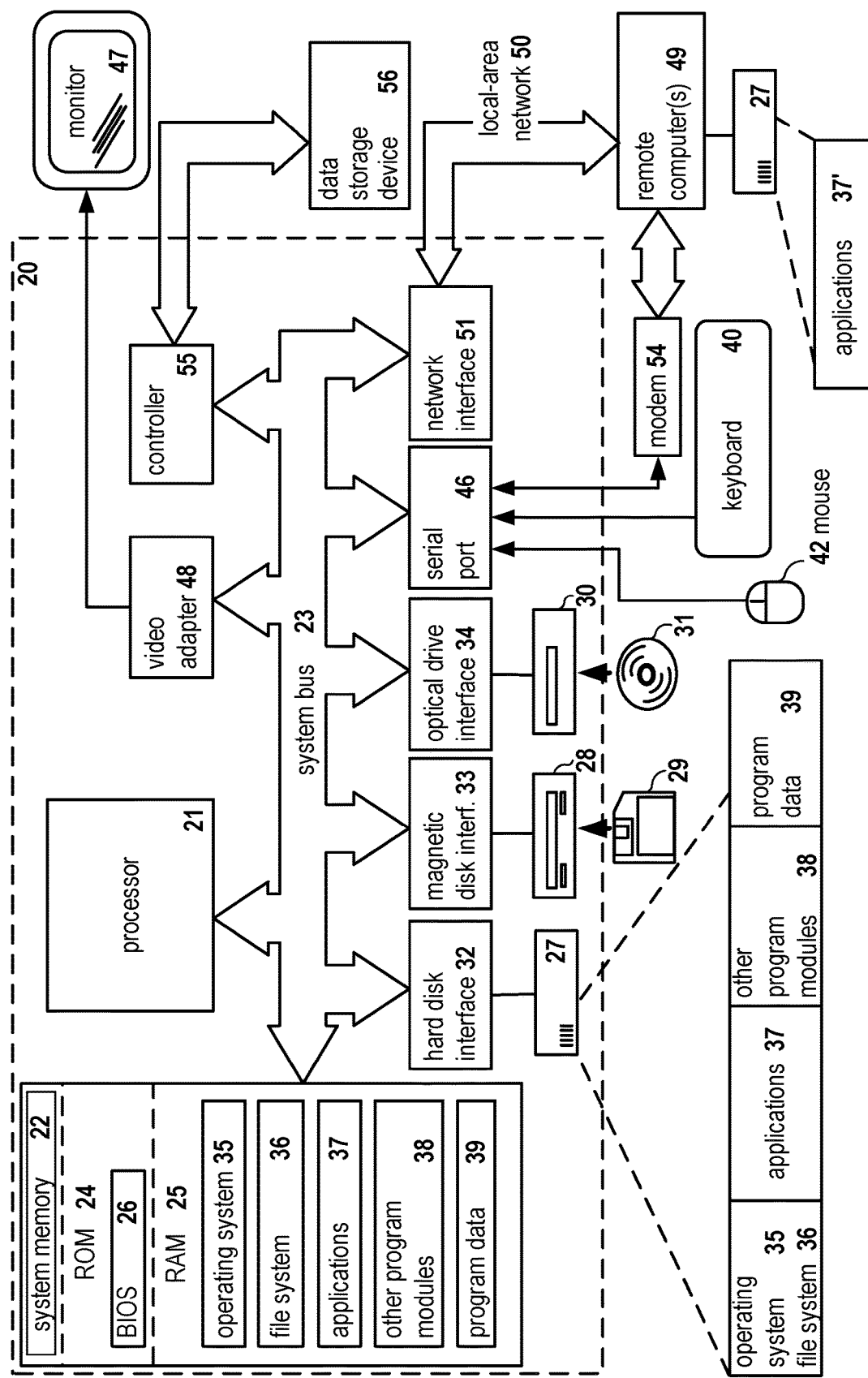
FIG. 7 is a block diagram of a computer system on which the disclosed system and method can be implemented according to an exemplary aspect.

FIG. 7 presents an example of a computer system 20 on which aspects of systems and methods for detecting attacks on electronics systems of a vehicle may be implemented in accordance with an exemplary aspect. In one particular aspect, the computer system may be used to realize the server 303, as well as the electronic systems of the MT. In another particular aspect, the electronic systems of the MT may also be realized with the use of specialized integrated circuits. In yet another particular aspect, the electronic systems of the MT may be realized with the use of a dedicated computer.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for generating rules for detecting and blocking attacks on electronics systems of a vehicle, comprising:
   receiving log data having a plurality of messages that have been intercepted on at least one communications bus between a plurality of electronic control units (ECUs) of the vehicle, wherein the plurality of messages have been intercepted during a period of time associated with a vehicle incident, the vehicle incident being an undesirable event resulting in a change to a behavior of the vehicle;
   detecting a computer attack based on analysis of the received log data;
   in response to detecting the computer attack, determining indicators of compromise including a subset of the plurality of messages used in the computer attack, and for each message, determining information on at least one ECU of the vehicle, the ECU being a recipient of the message; and
   generating a rule for a protection module executing in a processor in the vehicle, based on the indicators of compromise, wherein the rule contains:
      at least one condition for the application of the rule for detecting a subsequent computer attack on the vehicle, the at least one condition further specifying a presence of a defined group of messages during a period of time associated with movement of the vehicle and a state of movement of the vehicle, such that the rule is applied responsive to determining that the vehicle is in motion, and the rule is not applied responsive to determining that the vehicle is not moving, the defined group of messaged being arranged in a defined order, and
      at least one action upon application of the rule for blocking the subsequent computer attack on the vehicle.

2. The method of claim 1, wherein the log data further comprises information on at least one ECU which is the recipient of at least one of the intercepted messages.

3. The method of claim 1, wherein log data is received from the protection module executing in the processor in the vehicle.

4. The method of claim 1, wherein the vehicle incident comprises an occurrence of a road traffic accident with the vehicle.

5. The method of claim 1, wherein the communications bus comprises at least one of a Controller Area Network (CAN) bus, a Local Interconnect Network (LIN), a Media Oriented Systems Transport (MOST) bus, a FlexRay bus, and an Ethernet bus, wherein messages sent on the communications bus are broadcasted to all of the ECUs communicatively coupled to the communications bus.

6. The method of claim 1, wherein the at least one condition of the rule further specifies that the information indicating the at least one recipient ECU that is a recipient of the messages matches a defined group of ECUs.

7. The method of claim 1, wherein the rule specifies, responsive to determining that a portion of the intercepted messages matches a defined group of messages to a first recipient ECU, the at least one action upon application of the rule comprises blocking all messages from being transmitted on the communications bus to the first recipient ECU.

8. The method of claim 1, wherein the defined group of messages arranged in the defined order were intercepted during a defined interval of time.

9. The method of claim 1, wherein the at least one action upon application of the rule comprises transmitting to at least one ECU a message containing a command to disconnect the at least one ECU that is on a list of ECUs of auxiliary electronic systems of the vehicle.

10. The method of claim 1, wherein the at least one action upon application of the rule comprises transmitting to at least one ECU a message containing a command to enable a safety mode for the at least one ECU that is on a list of ECUs of primary electronic systems of the vehicle.

11. The method of claim 1, wherein the at least one action upon application of the rule comprises blocking transmission of at least one message from the communications bus to another communications bus of the vehicle via a gateway.

12. The method of claim 1, wherein the at least one action upon application of the rule comprises blocking transmission of at least one message between ECUs communicatively coupled on the same communications bus.

13. The method of claim 12, wherein the transmission of at least one message between ECUs is blocked by sending a sequence of bit zeros on the bus, such that a different value than the at least one message is established on the bus, causing a receiving ECU to disregard the at least one message due to a discrepancy in a checksum of the message.

14. A computer system for generating rules for detecting and blocking attacks on electronics systems of a vehicle, the computer system comprising:
a hardware processor configured to:
receive log data having a plurality of messages that have been intercepted on at least one communications bus between a plurality of electronic control units (ECUs) of the vehicle, wherein the plurality of messages have been intercepted during a period of time associated with a vehicle incident, the vehicle incident being an undesirable event resulting in a change to a behavior of the vehicle;
detect a computer attack based on analysis of the received log data;
in response to detecting the computer attack, determine indicators of compromise including a subset of the plurality of messages used in the computer attack, and for each message, determining information on at least one ECU of the vehicle, the ECU being a recipient of the message; and
generate a rule for a protection module executing in a processor in the vehicle, based on the indicators of compromise, wherein the rule contains:
at least one condition for the application of the rule for detecting a subsequent computer attack on the vehicle, the at least one condition further specifying a presence of a defined group of messages during a period of time associated with movement of the vehicle and a state of movement of the vehicle, such that the rule is applied responsive to determining that the vehicle is in motion, and the rule is not applied responsive to determining that the vehicle is not moving, the defined group of messaged being arranged in a defined order, and
at least one action upon application of the rule for blocking the subsequent computer attack on the vehicle.

15. The computer system of claim 14, wherein the log data further comprises information on at least one ECU which is the recipient of at least one of the intercepted messages, and wherein the vehicle incident comprises an occurrence of a road traffic accident with the vehicle.

16. The computer system of claim 14, wherein the communications bus comprises at least one of a Controller Area Network (CAN) bus, a Local Interconnect Network (LIN), a Media Oriented Systems Transport (MOST) bus, a FlexRay bus, and an Ethernet bus, wherein messages sent on the communications bus are broadcasted to all of the ECUs communicatively coupled to the communications bus.

17. The computer system of claim 14,
wherein the at least one condition of the rule further specifies that the information indicating the at least one recipient ECU that is a recipient of the messages matches a defined group of ECUs.

18. A non-transitory computer readable medium comprising computer executable instructions for generating rules for detecting and blocking attacks on electronics systems of a vehicle, including instructions for:
receiving log data having a plurality of messages that have been intercepted on at least one communications bus between a plurality of electronic control units (ECUs) of the vehicle, wherein the plurality of messages have been intercepted during a period of time associated with a vehicle incident, the vehicle incident being an undesirable event resulting in a change to a behavior of the vehicle;
detecting a computer attack based on analysis of the received log data;
in response to detecting the computer attack, determining indicators of compromise including a subset of the plurality of messages used in the computer attack, and for each message, determining information on at least one ECU of the vehicle, the ECU being a recipient of the message; and
generating a rule for a protection module executing in a processor in the vehicle, based on the indicators of compromise, wherein the rule contains:
at least one condition for the application of the rule for detecting a subsequent computer attack on the vehicle, the at least one condition further specifying a presence of a defined group of messages during a period of time associated with movement of the vehicle and a state of movement of the vehicle, such that the rule is applied responsive to determining that the vehicle is in motion, and the rule is not applied responsive to determining that the vehicle is not moving, the defined group of messaged being arranged in a defined order, and
at least one action upon application of the rule for blocking the subsequent computer attack on the vehicle.

19. The method of claim 1, wherein the subset of the messages include at least one of: an antivirus record, an IP address, a check sums of files, a URL address, and a domain names of a botnet command center.

20. The computer system of claim 14, wherein the defined group of messages arranged in the defined order were intercepted during a defined interval of time.

21. The computer system of claim 14, wherein the at least one action upon application of the rule comprises transmitting to at least one ECU a message containing a command to disconnect the at least one ECU that is on a list of ECUs of auxiliary electronic systems of the vehicle.

* * * * *